United States Patent
Park

(10) Patent No.: US 11,263,477 B2
(45) Date of Patent: Mar. 1, 2022

(54) METHOD OF AUTO-GENERATION OF MULTIDEPTH IMAGE BY INTERCONNECTING IMAGES INTO TREE STRUCTURE

(71) Applicant: PJ FACTORY CO., LTD., Seoul (KR)

(72) Inventor: Jung Hwan Park, Seoul (KR)

(73) Assignee: PJ FACTORY CO., LTD., Seoul (KR)

( * ) Notice: Subject to any disclaimer, the term of this patent is extended or adjusted under 35 U.S.C. 154(b) by 0 days.

(21) Appl. No.: 16/913,810

(22) Filed: Jun. 26, 2020

(65) Prior Publication Data

US 2020/0327366 A1 Oct. 15, 2020

Related U.S. Application Data

(63) Continuation of application No. PCT/KR2018/016820, filed on Dec. 28, 2018.

(30) Foreign Application Priority Data

Dec. 29, 2017 (KR) .................. 10-2017-0184767

(51) Int. Cl.
*G06K 9/62* (2006.01)

(52) U.S. Cl.
CPC ......... *G06K 9/6219* (2013.01); *G06K 9/6268* (2013.01)

(58) Field of Classification Search
None
See application file for complete search history.

(56) References Cited

U.S. PATENT DOCUMENTS

| 6,389,424 | B1 | 5/2002 | Kim et al. | |
| 8,041,154 | B2 | 10/2011 | Ohwa | |
| 8,073,265 | B2 | 12/2011 | Liao et al. | |
| 10,824,313 | B2 * | 11/2020 | Park | G06F 3/0486 |
| 2012/0306909 | A1 * | 12/2012 | Mochizuki | G06F 3/0481 345/619 |
| 2015/0235109 | A1 * | 8/2015 | Yoshii | G06K 9/6227 382/159 |
| 2018/0188926 | A1 * | 7/2018 | Park | G06F 3/0482 |
| 2020/0327366 | A1 * | 10/2020 | Park | G06K 9/6219 |

FOREIGN PATENT DOCUMENTS

| KR | 10-0284778 B1 | 3/2001 |
| KR | 10-1145278 B1 | 5/2012 |
| KR | 10-2013-0129725 A | 11/2013 |
| KR | 10-1333174 B1 | 11/2013 |
| KR | 10-1387849 B1 | 4/2014 |

OTHER PUBLICATIONS

International Search Report for PCT/KR2018/016820 dated Apr. 1, 2019 [PCT/ISA/210].
Written Opinion for PCT/KR2018/016820 dated Apr. 1, 2019 [PCT/ISA/237].

* cited by examiner

*Primary Examiner* — Tahmina N Ansari
(74) *Attorney, Agent, or Firm* — Sughrue Mion, PLLC

(57) ABSTRACT

A method of automatically generating a multi-depth image is disclosed. According to at least one embodiment of the present disclosure, a method performed by an electronic device for generating a multi-depth image, includes selecting a plurality of images, interconnecting, through image comparisons of the plurality of images, at least some of the images into a tree structure, and generating the multi-depth image in which at least some of the images are hierarchically inserted in the tree structure by inserting a lower node image into an upper node image.

7 Claims, 12 Drawing Sheets

| No. | File Name |
|---|---|
| 1 | Building Image.jpg |
| 2 | Main Gate Image.jpg |
| 3 | Restaurant Picture 1.jpg |
| 4 | Restaurant Picture 2.jpg |
| 5 | Restaurant Picture 3.jpg |
| 6 | Restaurant Picture 4.jpg |
| 7 | Car Wheel Image.jpg |
| 8 | Reflector Image.jpg |
| 9 | Store Image 1.jpg |
| 10 | Store Image 2.jpg |
| 11 | Store Image 3.jpg |
| 12 | Wall Image.jpg |
| 13 | Brick Image.jpg |
| 14 | Door Knob Image.jpg |
| 15 | Travel Site Picture 1.jpg |
| 16 | Travel Site Picture 2.jpg |
| 17 | Travel Site Picture 3.jpg |
| 18 | Car Image.jpg |
| 19 | Bulb Image.jpg |
| 20 | Window Image.jpg |
| 21 | Doorbell Image.jpg |
| 22 | Tire Image.jpg |
| 23 | Wheel Image.jpg |
| 24 | Headlight Image.jpg |

*FIG. 2A*

| No. | File Name |
|---|---|
| 1 | Building Image.jpg |
| 2 | Main Gate Image.jpg |
| 3 | Car Wheel Image.jpg |
| 4 | Reflector Image.jpg |
| 5 | Wall Image.jpg |
| 6 | Brick Image.jpg |
| 7 | Door Knob Image.jpg |
| 8 | Car Image.jpg |
| 9 | Bulb Image.jpg |
| 10 | Window Image.jpg |
| 11 | Doorbell Image.jpg |
| 12 | Tire Image.jpg |
| 13 | Wheel Image.jpg |
| 14 | Headlight Image.jpg |

*FIG. 2B*

METHOD OF AUTO-GENERATION OF MULTIDEPTH IMAGE BY INTERCONNECTING IMAGES INTO TREE STRUCTURE

CROSS-REFERENCE TO RELATED APPLICATION

This application is a continuation application of International Application No. PCT/KR2018/016820, filed on Dec. 28, 2018, which is based on and claims priority to Patent Application No. 10-2017-0184767, filed on Dec. 29, 2017 in Korea. The disclosures of the above-listed applications are hereby incorporated by reference herein in their entireties.

TECHNICAL FIELD

The present disclosure in some embodiments relates to a method of automatically generating a multi-depth image. More particularly, the present disclosure relates to a method of automatically generating a multi-depth image by comparing a plurality of images.

BACKGROUND

The statements in this section merely provide background information related to the present disclosure and do not necessarily constitute prior art.

When viewing an image through an electronic device, a user may want details of the image or magnified images of specific parts of the image. For example, as for a car image, the user may want to view a more detailed image of a specific part, such as a headlight, a car wheel, etc.

Portable electronic devices such as smart phones have such a small screen that makes it difficult to provide a discernible detailed image of a specific portion of the whole image. One may seek to obtain a discernible detailed image of the specific portion by zooming in the relevant image area, which provides a rough enlargement of the existing image with an increased pixel size rather than a satisfactory resolution, failing to present much anticipated additional information.

In order to solve such a deficiency, some inventors of the present disclosure had granted Korean Patent No. 10-1501028 (Registered May 31, 2014) for an invention of new format images (hereinafter, 'multi-depth image') and a method of creating the same which allows a basic image (hereinafter, 'main image') to be inserted with other images (hereinafter referred to as 'insert image') which can provide additional information.

This document discloses a multi-depth image definition and a user interface for creating and editing multi-depth images. However, the preceding invention merely discloses a method for allowing a user to generate a multi-depth image by manually selecting an insert image, inserting the same in a parent image at a proper position, but it fails to disclose a method of automatically generating a multi-depth image.

The present disclosure, following the preceding invention, is directed to a method of automatically generating a multi-depth image by comparing a plurality of given images.

DISCLOSURE

Technical Problem

The present disclosure in some embodiments seeks to provide a method of automatically generating a multi-depth image by comparing a plurality of images, obviating the need to manually generate the multi-depth image.

The technical problem to be solved by the present disclosure is not limited to providing the method mentioned above, and other unmentioned technical problems can be obviously derived by a person having ordinary skill in the art from the following description.

SUMMARY

At least one embodiment of the present disclosure provides a method performed by an electronic device for generating a multi-depth image, includes selecting a plurality of images, interconnecting, through image comparisons of the plurality of images, at least some of the images into a tree structure, and generating the multi-depth image in which at least some of the images are hierarchically inserted in the tree structure by inserting a lower node image into an upper node image.

The tree structure may be generated based on respective similarities and numbers of feature points of the plurality of images, or based on similarities and numbers of objects included in each of the plurality of images.

The interconnecting of the at least some of the images into the tree structure may comprise: extracting feature points from each of the plurality of images; classifying the images based on similarity of the feature points or to generate one or more image groups; generating, for each of the image group, a hierarchical structure between the images based on the number of the feature points included in the images which belong to each group, wherein an image having more feature points is located at a higher depth in the hierarchical structure; and generating the tree structure by interconnecting the image groups having the hierarchical structure. Alternatively, the interconnecting may comprise: recognizing objects from each of the plurality of images; classifying the images based on similarity between objects to generate one or more image groups; generating, for each of the image group, a hierarchical structure between images based on the number of the objects included in the images which belong to each group, wherein an image having more objects is located at a higher depth in the hierarchical structure; and generating the tree structure by interconnecting the image groups having the hierarchical structure. For interconnecting the image groups, the same image which belongs to at least two image group may be used as a link node or a common node.

Advantageous Effects

As described above, at least one embodiment of the present disclosure can automatically generate a multi-depth image by comparing a plurality of images and analyzing the similarity.

BRIEF DESCRIPTION OF THE DRAWINGS

FIGS. 2A and 2B are diagrams of a process of selecting material images in at least one embodiment of the present disclosure.

DETAILED DESCRIPTION

Figure 1:
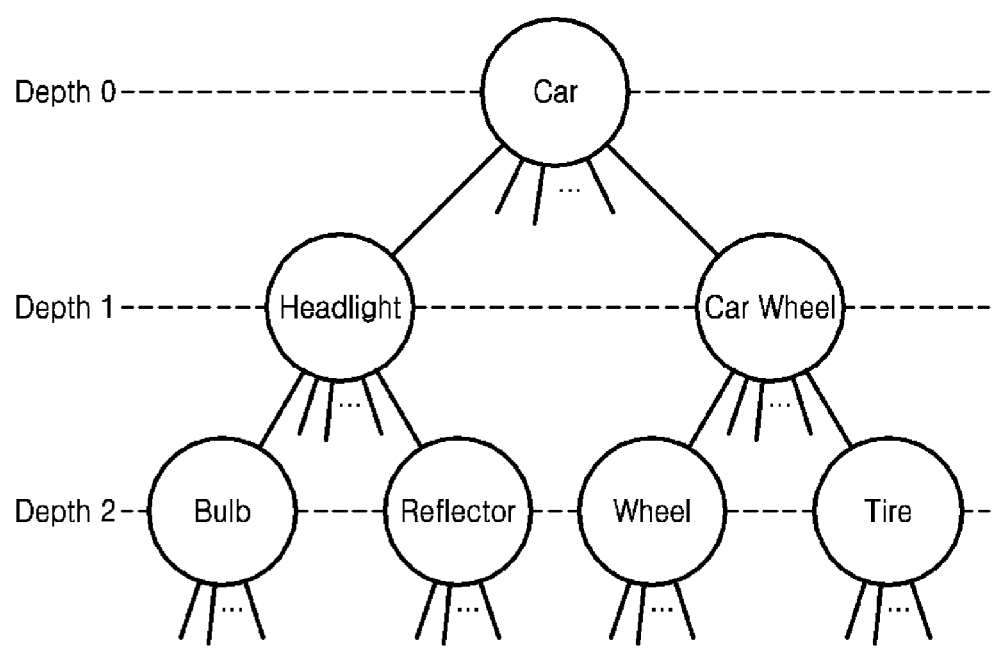
FIG. 1 is a conceptual diagram for explaining a multi-depth image.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, i), ii), (a), (b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary. The terms such as "unit," "module," and the like refer to units for processing at least one function or operation, which may be implemented by hardware, software, or a combination thereof.

1. Structure of Multi-Depth Image

FIG. 1 is a conceptual diagram for explaining the structure of a multi-depth image.

FIG. 1 is not an actual screen in which a multi-depth image is displayed in the image viewer, but a conceptual diagram of the image structure.

As shown in FIG. 1, a multi-depth image is a structure in which multiple images are connected in a tree structure. The topmost image of the tree structure is the main image. FIG. 1 illustrates the overall image of a car as the main image.

Images other than the main image are insert images. In the tree structure, the root node corresponds to the main image, and one or more insert images are linked under the main image with a parent, sibling, or child relationship to each other.

The main image has a depth of 0, and an insert image directly inserted into the main image has a depth of 1. For example, an image of a whole automobile (hereinafter, referred to as 'full car image') may be inserted with an image of a headlight (hereinafter, referred to as 'headlight image') and an image of a car wheel (hereinafter referred to as 'car wheel image') in which the headlight image and the car wheel image have a depth of 1.

Another insert image inserted into the insert image has a depth of 2 or more. For example, the headlight image having depth 1 may be inserted with an image of a bulb (hereinafter, referred to as 'bulb image') and an image of a reflector (hereinafter, 'reflector image') wherein the bulb image and the reflector image have a depth of 2, respectively. In addition, the car wheel image having depth 1 may be inserted with an image of a wheel (hereinafter, referred to as 'wheel image') and an image of a tire (hereinafter, 'tire image') in which the wheel image and the tire image have a depth of 2, respectively.

One may continue to insert images in this manner. For example, the bulb image, reflector image, wheel image, or tire image may be inserted with yet another image, wherein the yet another insert image has a depth of 3.

A plurality of images connected in a tree structure is stored as a single file together with properties defining connection relationship between images, to form a multi-depth image.

2. Basic Interface

In the multi-depth image, the image of the root node is the 'main image', and all images except the main image are 'insert images'. A user interface for inserting an insert image into the main image might include the following steps:

① Receive a user input to select the main image.
② Receive a user input to select an insert image.
③ Display, on the screen, the main image and the insert image which is iconized in a reduced state.
④ Receive a user input to drag the iconized insert image.
⑤ Receive the end of the drag input from the user.
⑥ Insert the insert image at the end position of the touch input.

A user interface for inserting another insert image into the insert image might include the following steps: ① Receive a user input to select the main image.
② Receive a user input to select an insert image.
③ Display, on the screen, the main image and the insert image which is iconized in a reduced state.
④ Receive a user input to drag the iconized insert image.
⑤ When the iconized insert image is dragged to the position where the existing insert image has been inserted, display the existing insert image on the screen in place of the main image.
⑥ Receive another user input to drag the iconized insert image.
⑦ Receive the end of the drag input from the user.
⑧ Insert the insert image at the end position of the touch input. When the existing insert image has a depth of N, the depth of the newly inserted image is N+1.

According to the above-described user interfaces, an insert image can be inserted by one-touch or one-click into the main image when creating and editing a multi-depth image.

However, regardless of how well the user interface is improved, the user is destined to personally select an image to insert and do it into an appropriate position, which takes a lot of time in creating a multi-depth image. In other words, manual generation of a multi-depth image greatly reduces the productivity of the multi-depth image. Therefore, it is necessary to automate the multi-depth image generation.

The following embodiment of the present disclosure provides a method of automatically generating a multi-depth image by comparing a plurality of images with each other.

3. Material Image Selection

A plurality of images needs to be selected for use as a material (hereinafter referred to as a "material image") as a preliminary work for automatically generating a multi-depth image. The material image may be in a general image format rather than a multi-depth image format. For example, the material image may be in an image format such as BMP, JPG, JPEG, GIF, PNG, TIF or TIFF among others.

When there is a low correlation between material images, the number of images for use in generating the multi-depth image is small, which is inefficient. Therefore, it is necessary to select the material image with the minimum relevance in the material image preparation stage.

Various methods can be used to select the minimum relevant material image. For example, a material image may be selected by using a storage location of the image, metadata information related to the image, and the like.

As a method of selecting a material image by using an image storage location, images stored in the same folder may be selected as material images. Alternatively, all images stored in a subfolder of a specific folder may be selected as material images. Alternatively, all images stored on a specific storage medium such as a USB may be selected as material images.

As a method of selecting a material image by using metadata of the image, a material image may be selected by using formation on the spatial location in which each image is generated, or information on the time at which each image is generated.

Some image files have metadata that can be used to verify the characteristics of the image. For example, pictures taken by a digital camera include photographer information, photographing time, GPS information on the photographing location, and manufacturer and model name of the camera used for photographing.

Based on the fact that pictures captured at the adjacent times are likely to be highly correlated, material images may be designated among a plurality of pictures when they have been captured at or within a preset time.

Alternatively, since pictures captured at adjacent places are likely to be highly correlated, material images may be designated among a plurality of pictures when their metadata describe GPS coordinates which are at or within a predetermined distance.

FIG. 2 is a diagram of a process of selecting material images in at least one embodiment of the present disclosure.

In order to present an illustrative embodiment of the present disclosure, it is assumed that the user has photographed a whole picture of a car, close-up pictures of different parts of the car, a whole picture of a building near the car, and close-up pictures of different parts of the building. More specifically, there are fourteen assumptively captured pictures of a full car image, headlight image, bulb image, reflector image, car wheel image, wheel image, tire image, full building image, window image, main gate image, doorbell image, door knob image, wall image and brick image.

On the other hand, the user took other pictures at different times and places and stored them in the same folder as the fourteen pictures above. For example, the user stored different photographs taken at a restaurant, photographs taken at a department store, and photographs taken at a travel site in the same folder as the one storing the above fourteen pictures. FIG. 2A shows a list of files stored in this folder.

As a method of selecting a material image among stored images, pictures taken at adjacent places and adjacent times may be selected as material images by using metadata included in those images. As a result, fourteen pictures of the car can be selected as material images, excluding the different photographs taken at the restaurant, photographs taken at the department store, and photographs taken at the travel site. FIG. 2B shows a list of files selected as material images among the files stored in the folder.

4. Method of Determining Similarity

A multi-depth image is generated by interconnecting material images with high similarity. A feature point algorithm may be used as a method of determining similarity.

Feature points are points representing a characteristic of a digital image, and refer to points that can be distinguished from other points. The feature points are generally located at the boundary, vertex, etc. of an object. Local patterns present in an image can also be feature points. Any other points can be feature points as long as they are characteristic of digital images and are distinguishable from other points.

Each image usually has thousands of feature points to be extracted, although it depends on the size and content of the image. Feature point extraction plays a very important role in image matching. Image matching is a task of finding corresponding parts in two images of the same object by using feature points, and it is used for various applications including object recognition, three-dimensional structure calculation, stereo matching, motion tracking, and panoramic image generation.

The feature points appear at the boundaries, vertices, and local patterns of the object, and therefore even the same object is liable to be imaged differently with varying scales of the image or varying viewpoints of the object. In order to tackle this issue, various feature point extraction algorithms are being developed which are robust to image brightness change, ambient illumination change, image scale change, rotation, distortion, and 3D perspective change, etc.

As an example of feature extraction algorithms, Harris proposed a method of detecting a corner by a feature point. Lindeberg proposed a method that analyzes the structure of an image by using a scale space, and performs blob (a set of adjacent pixels with similar characteristics) detection and automatic scale selection. In addition, Schmid described the local feature amounts or feature values that are robust to the rotation of the image, using feature values calculated from the pixel values and differential values of the feature points detected by the Harris corner detector.

In 1999, Lowe proposed Scale-Invariant Feature Transform (SIFT), an innovative feature point extraction algorithm that can extend Schmid's concept of local feature values and describe feature points that are invariable regardless of changes in scale of the image and the rotation thereof by using the scale space. Many additional methods that extend SIFT have been proposed such as a PCA-SIFT (Principal Component Analysis-SIFT) that projects gradient information to subspaces by using PCA and improves matching accuracy, and BSIFT that reduces the influence of the background at the time of describing feature values of SIFT.

The method according to at least one embodiment of the present disclosure can extract the feature points from each image by using various feature point extraction algorithms, and then determine the similarity of two images.

Alternatively, the similarity of two images may be determined by a technique using machine learning instead of a rule-based feature point extraction algorithm.

Hereinafter, it is assumed that the similarity 100% means completely identical images, and the similarity 0% means non-similar images.

5. Similarity Determination Result

Figure 3:
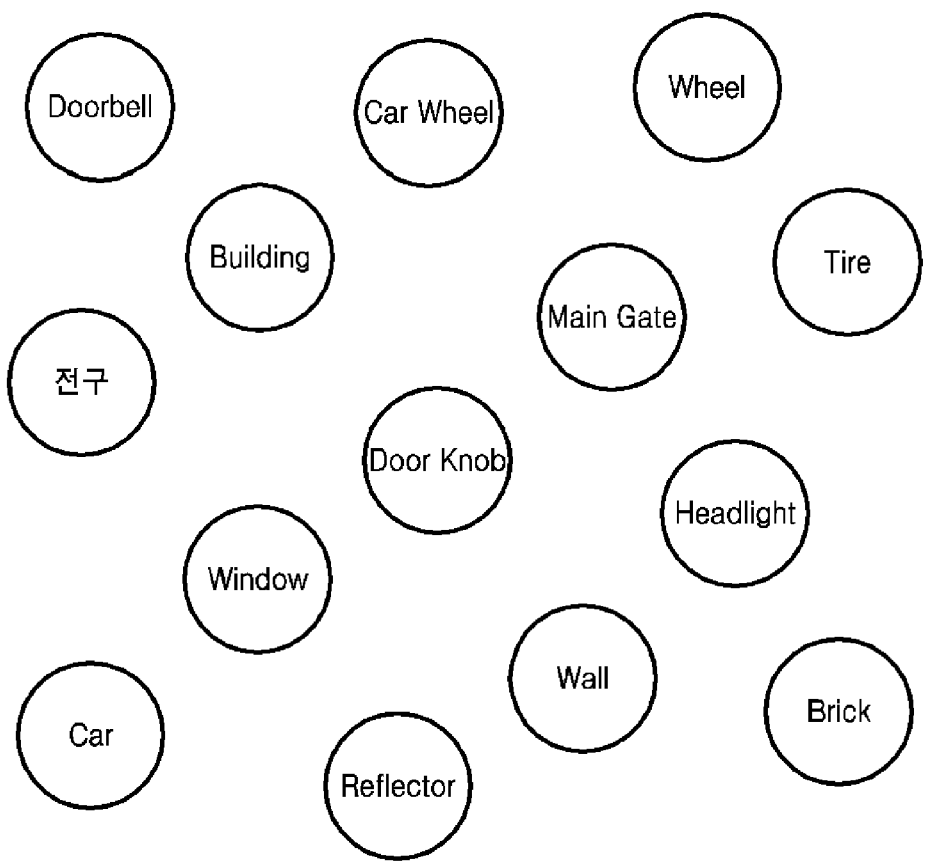
FIG. 3 is a diagram of material images indicated as nodes in at least one embodiment of the present disclosure.

FIG. 3 is a diagram of material images indicated as nodes in at least one embodiment of the present disclosure.

It should be noted that FIG. 3 is merely a conceptual diagram of material images indicated as nodes in a structure of a multi-depth image rather than an actual screen in which each material image is displayed in an image viewer.

Figure 4:
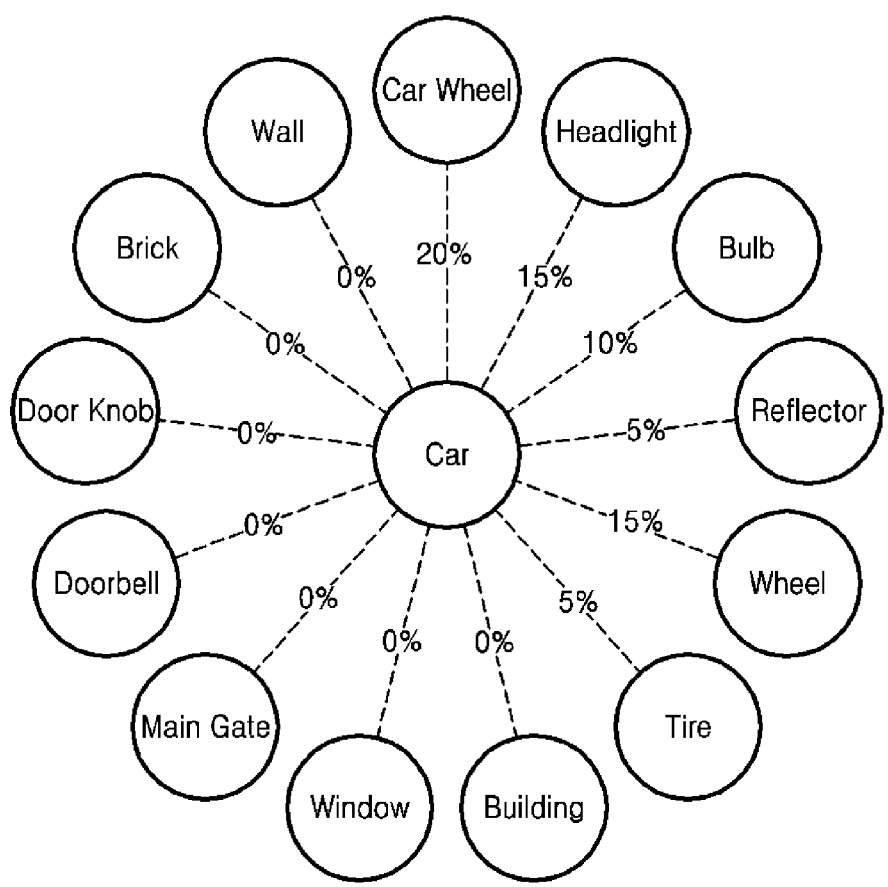
FIG. 4 is a diagram of a result of determining the degree of similarity between a full car image and other images in at least one embodiment.

FIG. 4 is a diagram of a result of determining the degree of similarity between a full car image and other images in at least one embodiment.

As a result of similarity determination, the similarity of the full car image with the car wheel image was calculated to be 20%. A similarity of 15% was calculated with the headlight image, similarity 10% with the bulb image, similarity 5% with the reflector image, similarity 15% with the wheel image, similarity 5% with the tire image, similarity 0% with the full building image, similarity 0% with the window image, similarity 0% with the main gate image, similarity 0% with the doorbell image, similarity 0% with the handle image, similarity 0% with the brick image, and similarity 0% with the wall image. There are six images with a similarity of 5% or more compared to the full car image.

Figure 5:
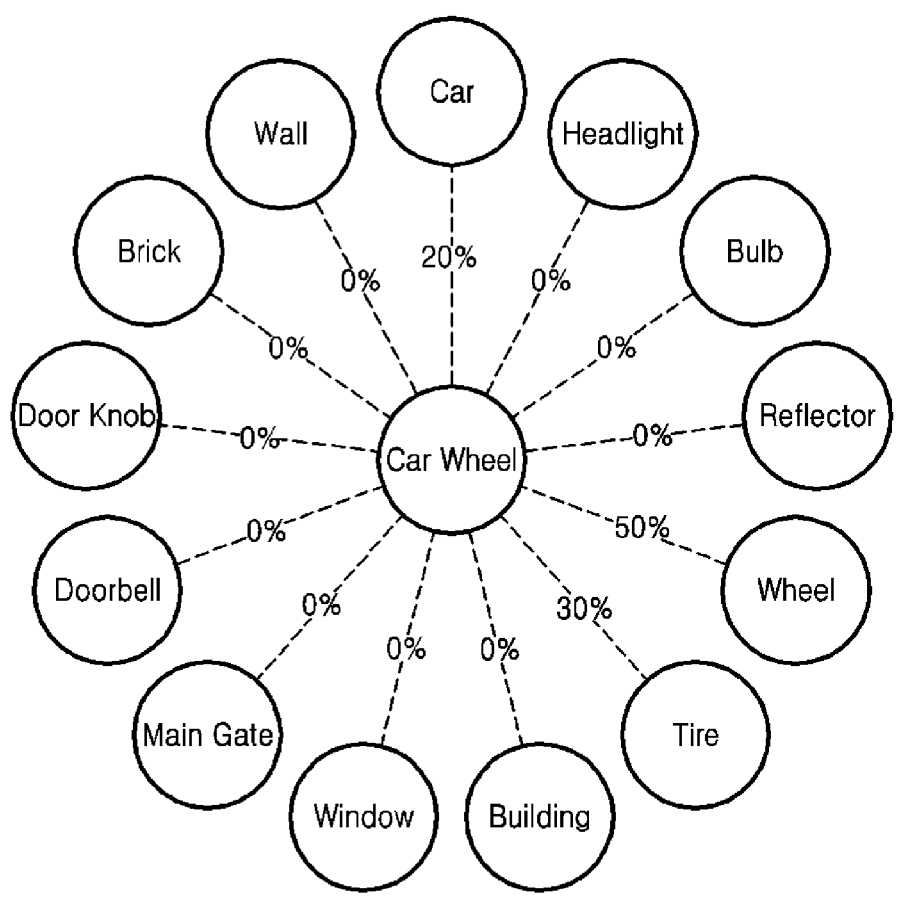
FIG. 5 is a diagram of a result of determining similarity between a car wheel image and other images according to at least one embodiment.

FIG. 5 is a diagram of a result of determining similarity between a car wheel image and other images according to at least one embodiment.

As a result of similarity determination, the similarity of the car wheel image with the full car image was calculated to be 20%. A similarity of 0% was calculated with the headlight image, similarity 0% with the bulb image, similarity 0% with the reflector image, similarity 50% with the wheel image, similarity 30% with the tire image, similarity 0% with the full building image, similarity 0% with the window image, similarity 0% with the main gate image, similarity 0% with the doorbell image, similarity 0% with the handle image, similarity 0% with the brick image, and similarity 0% with the wall image. There are three images with a similarity of 5% or more compared to the full car wheel image.

As will be described later, an image having more other images whose similarities compared with the image are of at least a minimum similarity value is located at a parent node. Assuming that the minimum similarity value is 5%, and referring to FIGS. 4 and 5, the full car image has six images with a similarity of 5% or more when compared therewith, but the car wheel image has three images with a similarity of 5% or more when compared therewith. In this case, the full car image is placed at the parent node of the car wheel image. This results in a structure where the car wheel image is inserted into the car image.

Figure 6:
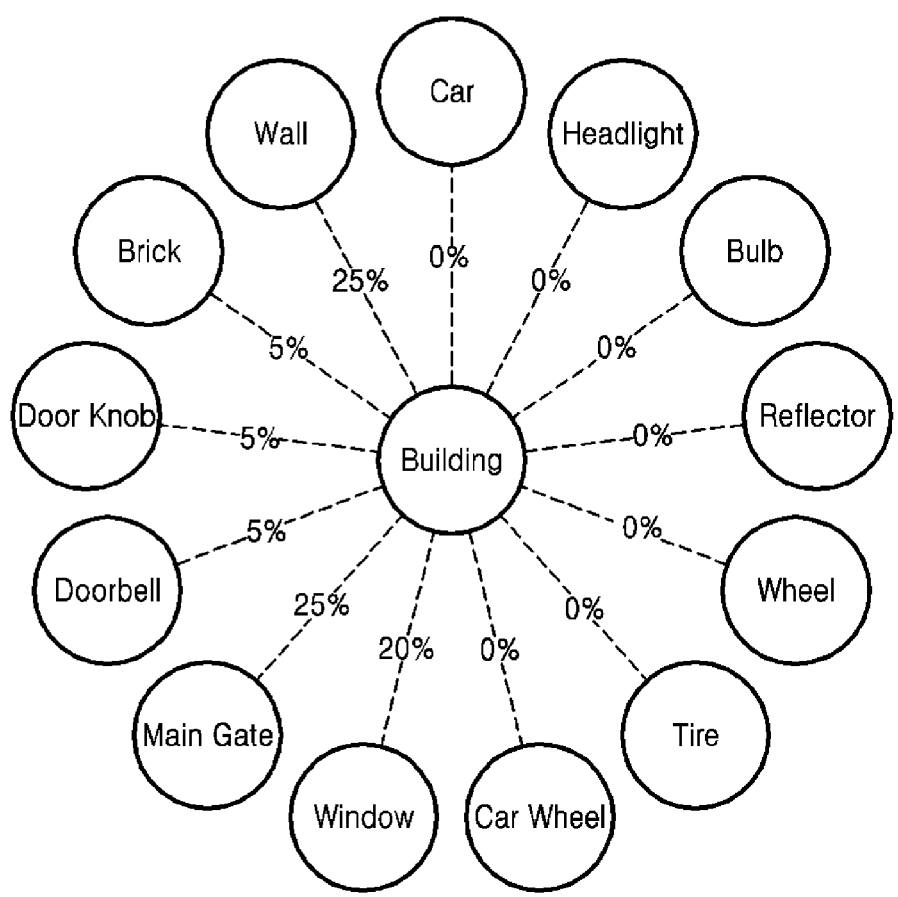
FIG. 6 is a diagram of a result of determining similarity between a full building image and other images in at least one embodiment.

FIG. 6 is a diagram of a result of determining similarity between a full building image and other images in at least one embodiment.

As a result of similarity determination, the similarity of the full building image with the full car image was calculated to be 0%. A similarity of 0% was calculated with the headlight image, similarity 0% with the bulb image, similarity 0% with the reflector image, similarity 0% with the wheel image, similarity 0% with the tire image, similarity 0% with the car wheel image, similarity 20% with the window image, similarity 25% with the main gate image, similarity 5% with the doorbell image, similarity 5% with the handle image, similarity 5% with the brick image, and similarity 25% with the wall image. There are six images with a similarity of 5% or more compared to the full building image.

Figure 7:
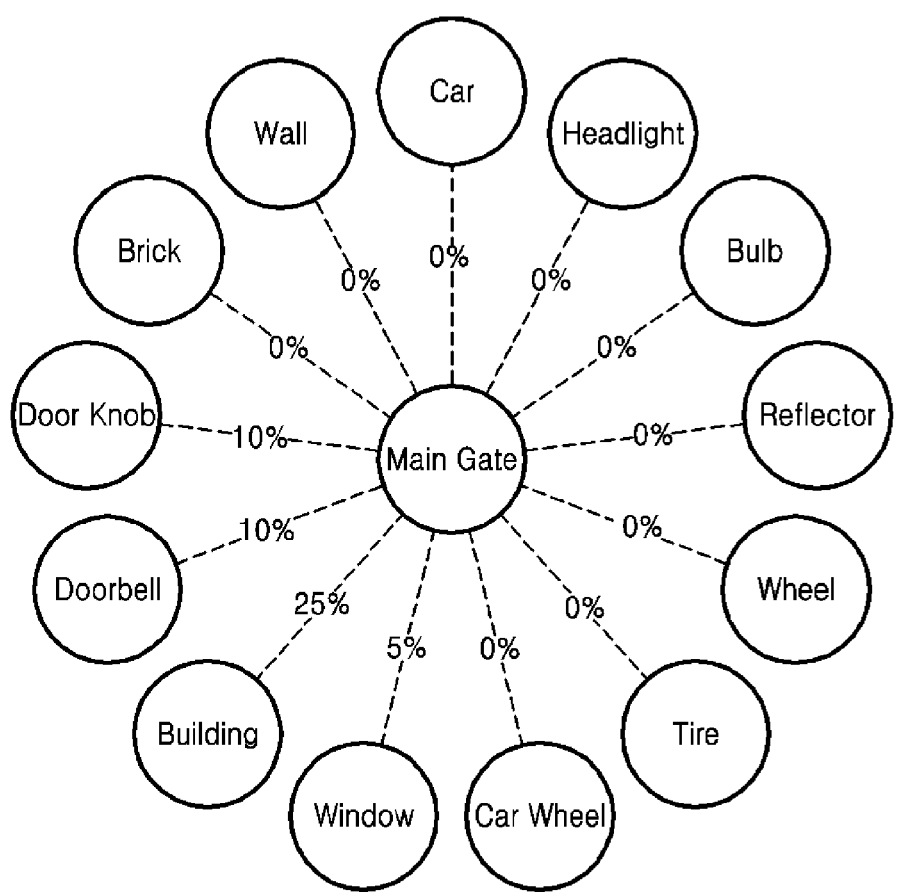
FIG. 7 is a diagram of a result of determining similarity between a main gate image and other images in at least one embodiment.

FIG. 7 is a diagram of a result of determining similarity between a main gate image and other images in at least one embodiment.

As a result of similarity determination, the similarity of the main gate image with the full car image was calculated to be 0%. A similarity of 0% was calculated with the headlight image, similarity 0% with the bulb image, similarity 0% with the reflector image, similarity 0% with the wheel image, similarity 0% with the tire image, similarity 0% with the car wheel image, similarity 5% with the window image, similarity 25% with the full building image, similarity 10% with the doorbell image, similarity 10% with the handle image, similarity 0% with the brick image, and similarity 0% with the wall image. There are four images with a similarity of 5% or more compared to the main gate image.

Assuming that the minimum similarity value is 5%, and referring to FIGS. 6 and 7, the full building image has six images with a similarity of 5% or more when compared therewith, but the main gate image has four images with a similarity of 5% or more when compared therewith. In this case, the full building image is placed at the parent node of the main gate image. This results in a structure where the main gate image is inserted into the full building image.

The degree of similarity is determined for all the material images by the same method as the FIGS. 4 to 7.

6. Generation of Tree Structure

A multi-depth image has multiple images connected in a tree structure. As long as multiple images are connected in a tree structure, even those images interconnected with no relevance can constitute a multi-depth image. However, less useful is the multi-depth images made by linking images that have no relevance. Therefore, a multi-depth image is better generated by connecting images having high similarity to each other.

In this regard, when automatically generating a multi-depth image from a plurality of material images, the multi-depth image may be generated by connecting the material images with a high degree of similarity to each other through an image matching process.

Specifically, a multi-depth image may be generated by first connecting a material image having a high degree of similarity, and then connecting a material image having a lower degree of similarity.

An illustrative method of automatically generating a multi-depth image according to at least one embodiment of the present disclosure will be described as it firstly connects the material images having similarity of 30% or more, secondly connects the material images having similarity of 20% or more, and thirdly connects the material images having similarity of 10% or more, to generate a multi-depth image.

Figure 8:
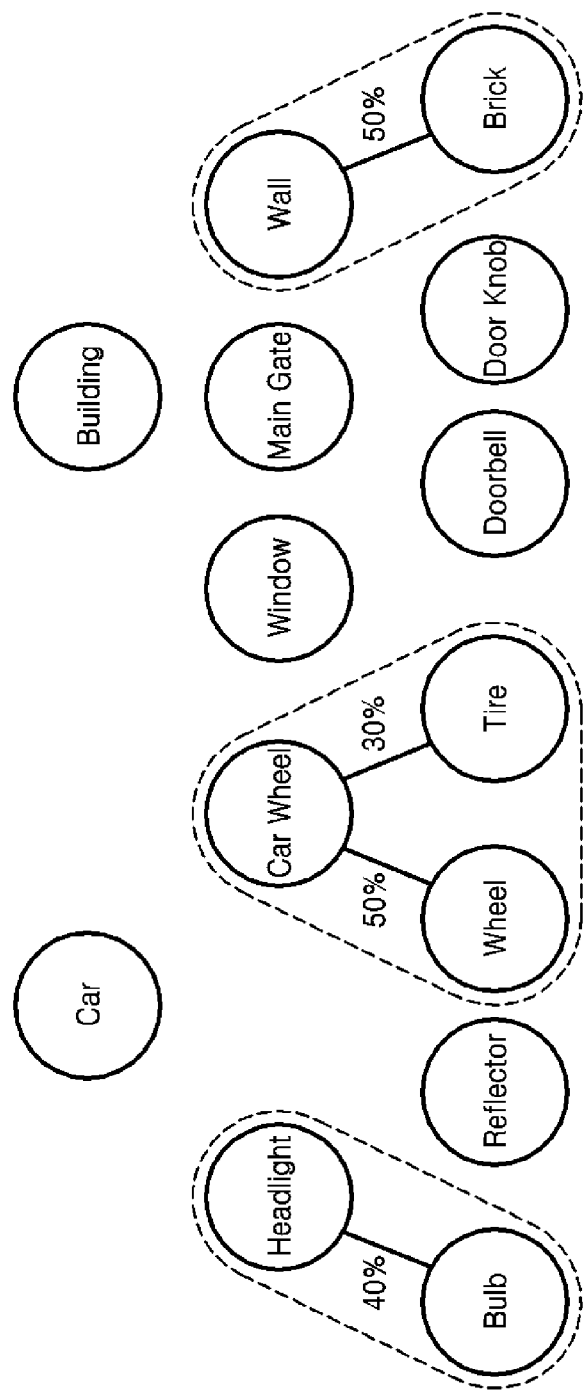
FIG. 8 is a diagram of a process of connecting material images having a degree of similarity of 30% or more in a tree structure according to at least one embodiment.

FIG. 8 is a diagram of a process of connecting material images having a degree of similarity of 30% or more in a tree structure according to at least one embodiment.

As shown in FIG. 8, material images are retrieved having a degree of similarity of 30% or more, and they are the headlight image and bulb image (similarity 40%), car wheel image and wheel image (similarity 50%), car wheel image and tire image (similarity 30%), and wall image and brick image (similarity FIG. 50%). As described above, the degree of similarity may be determined through comparison of feature points. For example, the degree of similarity may be determined based on the similarity and the number of the feature points of each material image.

Groups are formed among the material images having a degree of similarity of 30% or more, respectively between the headlight image and a bulb image, between the car wheel image and wheel image, between the car wheel image and tire image, and between the wall image and brick image. The images in each group are linked to form a tree structure.

When generating the tree structure by connecting images in each group, parent node and child node need to be determined. The similarity and the number of the feature points included in each image may be considered in determining a particular image in each group as a parent node and a particular image as a child node.

For example, in the process of connecting the car wheel image and the wheel image in the same group into a tree structure, each image are compared with other material images, to place, in the parent node, such an image that has more other material images with a degree of similarity that is the minimum similarity value or more. An image related to more other images in view of the minimum similarity generally has more feature points. Therefore, the selection of the parent node among images which belong to the same group may be based on the number of the feature points of the images.

Assuming 5% is the minimum similarity value, the full car image, wheel image and tire image are three images having a similarity of 5% or more in comparison with the car wheel image (see FIG. 5). On the other hand, in comparison with the wheel image, two images having a similarity of 5% or more are assumed to be the car wheel image and tire image (not shown).

In this case, the car wheel image may be located at the parent node when interconnecting the car wheel image and the wheel image, since the car wheel image and the wheel image respectively have the three images and two images with degrees of similarity that are the minimum similarity value or more.

On the other hand, a tree structure may be generated by using the result of recognizing objects in respective material images without determining the similarity between the material images.

For example, when objects named 'bulb' and 'reflector' are recognized in the headlight image, while the object 'bulb' is recognized in a bulb image, and the object 'reflector' is recognized in a reflector image, the bulb image and reflector image may be connected as the child nodes of the headlight image. In other words, the headlight image having the larger number of recognized objects becomes the parent node.

Similarly, when objects called 'wheel' and 'tire' are recognized in the car wheel image, while the object 'wheel' is recognized in the wheel image, and the object 'tire' is recognized in the tire image, the wheel image and tire image may be connected as the child nodes of the car wheel image. In other words, the car wheel image having the larger number of recognized objects becomes the parent node.

Figure 9:
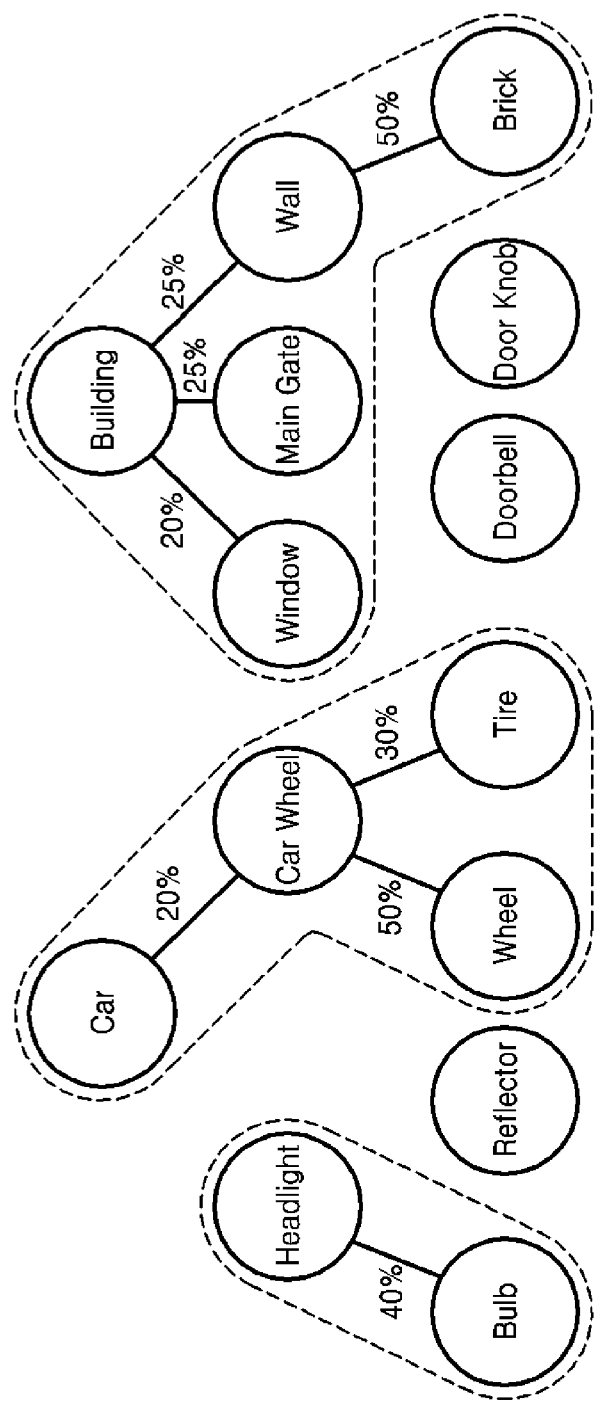
FIG. 9 is a diagram of a process of connecting material images having a degree of similarity of 20% or more in a tree structure according to at least one embodiment.

FIG. 9 is a diagram of a process of connecting material images having a degree of similarity of 20% or more in a tree structure according to at least one embodiment.

As shown in FIG. 9, among the material images with the similarity of 20% or more, images which is not connected in a tree structure are the full car and car wheel images (similarity 20%), the full building and window images (similarity 20%), the full building and main gate images (similarity 25%), and the full building and wall images (similarity 25%).

Among the material images with the similarity of 20% or more, the full car and car wheel images, the full building and window images, the full building and main gate images, and the full building and wall images, which are yet to compose a tree structure, respectively form groups, and the images in each group are linked together to generate a tree structure.

When generating the tree structure by connecting images in each group, the parent node and the child node needs to be determined. The similarity and the number of the feature points included in each image may be considered in determining which image in each group is a parent node and which image is a child node.

For example, in FIG. 9, when interconnecting the full car image and the car wheel image in the same group into a tree structure, the both images are each compared with other material images, to place, in the parent node, such an image that has more other material images with a degree of similarity that is the minimum similarity value or more.

Assuming 5% is the minimum similarity value, six images having a similarity of 5% or more in comparison with the full car image are the car wheel image, headlight image, bulb image, reflector image, wheel image, and tire image (see FIG. 4). On the other hand, in comparison with the car wheel image, three images having a similarity of 5% or more are the full car image, wheel image and tire image (see FIG. 5).

Therefore, the full car image may be located at the parent node when interconnecting the full car image and the car wheel image, each having the six images and three images with degrees of similarity that are the minimum similarity value or more.

Figure 10:
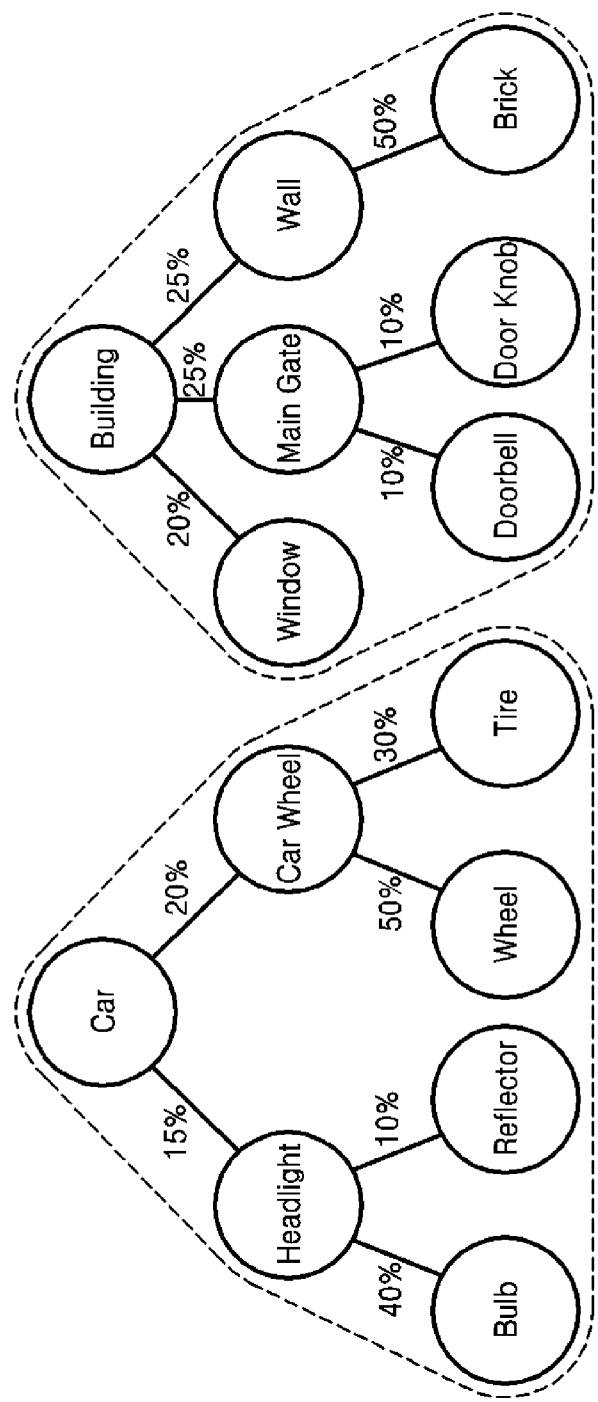
FIG. 10 is a diagram of a process of connecting material images having a degree of similarity of 10% or more in a tree structure according to at least one embodiment.

FIG. 10 is a diagram of a process of connecting material images having a degree of similarity of 10% or more in a tree structure according to at least one embodiment.

As shown in FIG. 10, among the material images with the similarity of 10% or more, images which is not connected in a tree structure are the full car and headlight images (similarity 15%), the main gate and doorbell images (similarity 10%), and the main gate and handle images (similarity 10%).

Among the material images with the similarity of 10% or more, the full car and headlight images, the main gate and doorbell images, and the main gate and handle images, which are yet to compose a tree structure, respectively form groups, and the images in each group are linked together to generate a tree structure.

When generating the tree structure by connecting images in each group, the parent node and the child node needs to be determined. The similarity and the number of the feature points included in each image may be considered in determining which image in each group is a parent node and which image is a child node. This is the same as described in FIGS. 8 and 9, and a detailed description thereof will be omitted.

Alternatively, in order to generate the tree structure, the images may classified into one or more image groups by comparing similarity of the feature points of the images or similarity between objects in the images. The same image may belong to a plurality of image groups. For example, with reference to FIG. 1, four image groups may be generated: {Car, Headlight, Bulb}, {Car, Headlight, Reflector}, {Car, Car Wheel, Wheel}, and {Car, Car Wheel, Tire}. A hierarchical structure is generated for each of the image groups. In each of the image groups, an image having more feature points or more objects is located at a higher depth in the hierarchical structure. The tree structure is generated by interconnecting the image groups each of which has the hierarchical structure. The same image that belongs to two image groups is used as a common node. That is, the tree structure is generated by connecting depths or nodes corresponding to the same image in the image groups.

7. Generation of Multi-Depth Image

Figure 11:
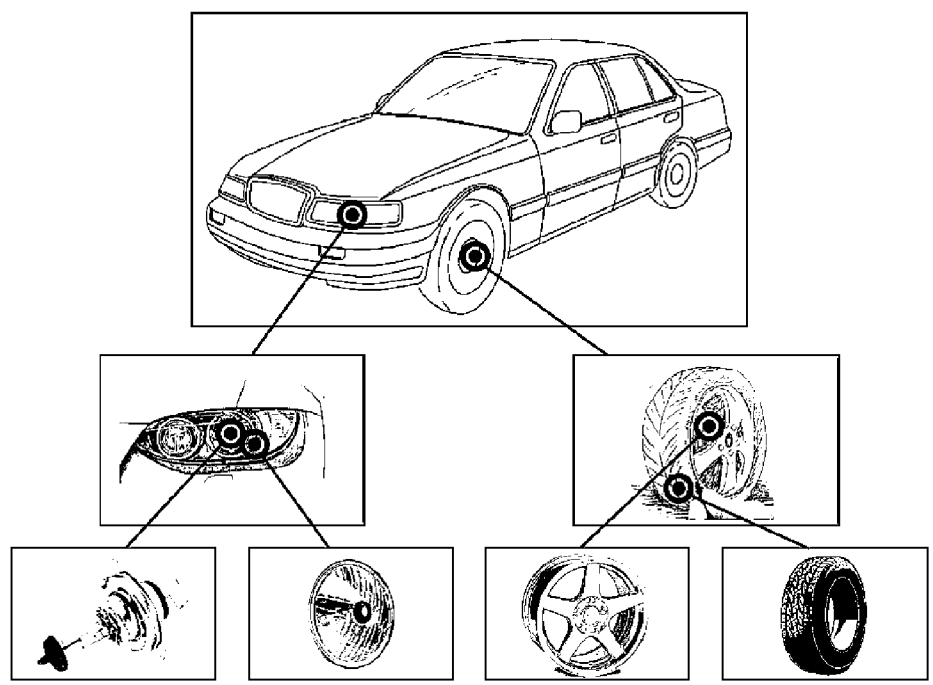
FIG. 11 is a diagram of a process of generating a multi-depth image by referring to a tree structure in at least one embodiment.

FIG. 11 is a diagram of a process of generating a multi-depth image by referring to a tree structure in at least one embodiment.

When the tree structure generation is completed, the tree structure is used to generate the multi-depth image by inserting the image corresponding to the child node into the image corresponding to the parent node. Specifically, a multi-depth image may be generated by searching, in the parent node image of the tree structure, for an area corresponding to the child node image, and inserting the child node image into the retrieved area in the parent node image.

As shown in the final tree structure of FIG. 10, the full car image has, underneath it, the headlight image and car wheel image. The headlight image has, underneath it, the bulb image and reflector image. The car wheel image has, underneath it, the wheel image and tire image.

By using this tree structure, an image corresponding to a child node is inserted at an appropriate position of the image corresponding to the parent node.

Specifically, the headlight image may be inserted in the full car image at a position where the feature of the headlight image is found. For example, after performing an image matching between the full car image with the headlight image by comparing the feature points extracted from the full car image with the feature points extracted from the headlight image, it is determined whether feature points of the headlight image are found at a specific position of the full car image, and if yes, the headlight image may be inserted at that position.

In addition, after performing an image matching between the full car image with the car wheel image by comparing the feature points extracted from the full car image with the feature points extracted from the car wheel image, it is determined whether feature points of the car wheel image are found at a specific position of the full car image, and if yes, the car wheel image may be inserted at that position.

In addition, after performing an image matching between the headlight image with the bulb image by comparing the feature points extracted from the headlight image with the feature points extracted from the bulb image, it is determined whether feature points of the bulb image are found at a specific position of the headlight image, and if yes, the bulb image may be inserted at that position.

In addition, after performing an image matching between the headlight image with the reflector image by comparing the feature points extracted from the headlight image with the feature points extracted from the reflector image, it is determined whether feature points of the reflector image are found at a specific position of the headlight image, and if yes, the reflector image may be inserted at that position.

In addition, after performing an image matching between the car wheel image with the wheel image by comparing the feature points extracted from the car wheel image with the feature points extracted from the wheel image, it is determined whether feature points of the wheel image are found at a specific position of the car wheel image, and if yes, the wheel image may be inserted at that position.

Further, after performing an image matching between the car wheel image with the tire image by comparing the feature points extracted from the car wheel image with the feature points extracted from the tire image, it is determined whether feature points of the tire image are found at a specific position of the car wheel image, and if yes, the tire image may be inserted at that position.

As described above, a multi-depth image may be generated by inserting every child node image into all parent node images of the tree structure.

8. Flowchart

Figure 12:
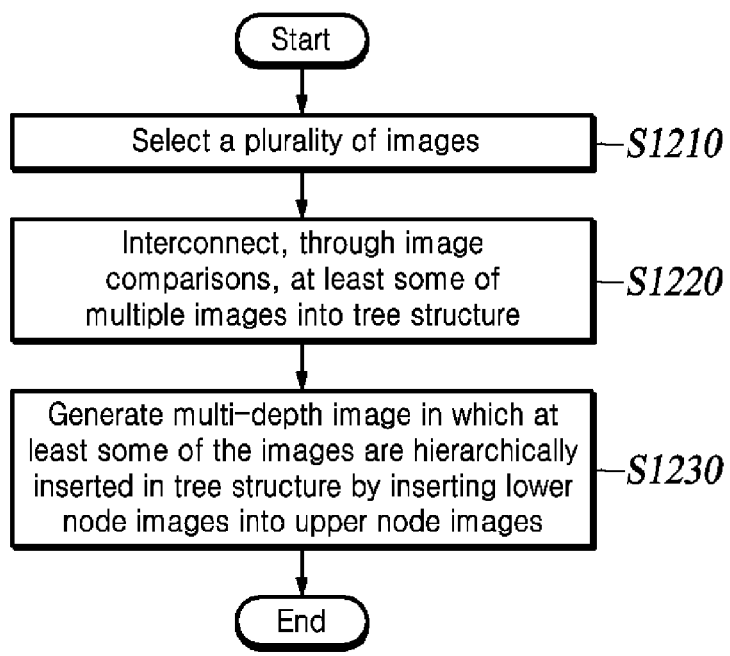
FIG. 12 is a flowchart of a method of automatically generating a multi-depth image according to at least one embodiment.

FIG. 12 is a flowchart of a method of automatically generating a multi-depth image according to at least one embodiment.

A method of automatically generating a multi-depth image according to at least one embodiment of the present disclosure includes selecting a plurality of images (S1210), interconnecting, through image comparisons, at least some of the plurality of images into a tree structure (S1220), and generating a multi-depth image in which at least some of the images are hierarchically inserted in the tree structure by inserting lower node images into upper node images (S1230).

The remaining descriptions, duplicative of those described in the above embodiments, are omitted to avoid redundancy.

Although the steps S1210 to S1230 in FIG. 12 are described to be sequentially performed, they merely instantiate the technical idea of some embodiments of the present disclosure, and hence the steps S1210 to S1230 in FIG. 12 are not limited to the illustrated chronological sequences. Therefore, a person having ordinary skill in the pertinent art could appreciate that various modifications, additions, and substitutions are possible by changing the sequences of the steps S1210 to S1230, by omitting one or more steps in S1210 to S1230, or by performing two or more of the steps in S1210 to S1230 in parallel, without departing from the gist and the nature of the embodiments of the present disclosure.

The method described in the above embodiments can be implemented as one or more programs which include instruction codes readable by a processor of an electronic device such as a computer or smartphone and are stored in a recording medium readable by the processor. Specifically, the computer- or smartphone-readable recording medium includes a magnetic recording medium (e.g., a ROM, a floppy disk, a hard disk, etc.), an optically readable medium (e.g., a CD-ROM, a DVD, etc.), a flash memory (e.g., USB, SSD), and the like. Further, the computer- or smartphone-readable recording medium can be distributed in computer systems connected via a network, wherein computer- or smartphone-readable codes can be stored and executed in a distributed fashion.

Although exemplary embodiments of the present disclosure have been described for illustrative purposes, those skilled in the art will appreciate that various modifications, additions and substitutions are possible, without departing from the idea and scope of the claimed invention.

The exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

The invention claimed is:

1. A method performed by an electronic device for generating a multi-depth image, the method comprising:
    selecting a plurality of images each of which is a separate image file;
    interconnecting, without a user intervention, at least some of the images into a tree structure, by respectively associating the at least some of the images with nodes of the tree structure based on similarities of features or objects between the at least some of the images; and generating, without a user intervention, a single image file of the multi-depth image in which, for the nodes of the tree structure, a child node image of the tree structure is inserted into a parent node image of the tree structure, by performing a process comprising:

searching for, within the parent node image of the tree structure, an area corresponding to the child node image;

inserting the child node image at the searched area within the parent node image; and defining attribute information for representing a connection relationship between the parent node image and the child node image.

2. The method of claim 1, wherein the images is selected by using at least one of a storage location and metadata of each image.

3. The method of claim 2, wherein the metadata comprises information on at least one of a spatial position and a time at which each image is generated.

4. The method of claim 1, wherein the at least some of the images are interconnected in the tree structure based on respective similarities and numbers of feature points of the images, or based on similarities and numbers of objects included in each of the images.

5. The method of claim 4, wherein the interconnecting of the at least some of the images into the tree structure comprises:

extracting feature points from each of the images;

classifying the images based on similarity of the feature points to generate one or more image groups;

generating, for each of the image group, a hierarchical structure between the images based on the number of the feature points included in the images which belong to each group, wherein an image having more feature points is located at a higher depth in the hierarchical structure; and generating the tree structure by interconnecting the image groups each having the hierarchical structure.

6. The method of claim 4, wherein the interconnecting of the at least some of the images into the tree structure comprises:

recognizing objects from each of the images;

classifying the images based on similarity between objects to generate one or more image groups;

generating, for each of the image group, a hierarchical structure between the images based on the number of the objects included in the images which belong to each group, wherein an image having more objects is located at a higher depth in the hierarchical structure; and generating the tree structure by interconnecting the image groups each having the hierarchical structure.

7. A non-transitory computer-readable recording medium storing a computer program including computer-executable instructions for causing, when executed in a processor, the processor to perform the method of claim 1.

\* \* \* \* \*